United States Patent [19]
Cheney

[11] Patent Number: 5,729,093
[45] Date of Patent: Mar. 17, 1998

[54] CONTROL FOR MULTIPLE CIRCUIT ELECTROLUMINESCENT LAMP PANEL

[75] Inventor: David Scott Cheney, White Lake, Mich.

[73] Assignee: Ford Motor Company, Dearborn, Mich.

[21] Appl. No.: 512,499

[22] Filed: Aug. 8, 1995

[51] Int. Cl.⁶ ............................................... G09G 3/10
[52] U.S. Cl. ............................................... 315/169.3
[58] Field of Search ...................................... 315/169.3

[56] References Cited

U.S. PATENT DOCUMENTS

| | | | |
|---|---|---|---|
| 4,060,703 | 11/1977 | Everett, Jr. | 200/5 A |
| 4,320,268 | 3/1982 | Brown | 200/5 A |
| 4,449,024 | 5/1984 | Stracener | 200/317 |
| 4,532,395 | 7/1985 | Zukowski | 200/314 |
| 4,641,963 | 2/1987 | Levine | 356/124.5 |
| 4,642,627 | 2/1987 | Hodsdon | 340/765 |
| 4,667,273 | 5/1987 | Queudray | 362/34 |
| 4,725,761 | 2/1988 | Schroeder et al. | 315/169.3 |
| 4,730,146 | 3/1988 | Maser et al. | 313/511 |
| 4,740,781 | 4/1988 | Brown | 340/712 |
| 4,764,719 | 8/1988 | Zeh | 324/73 PC |
| 4,812,831 | 3/1989 | Laier | 340/711 |
| 4,916,262 | 4/1990 | Jungels-Butler et al. | 200/5 A |
| 4,963,861 | 10/1990 | Thioulouse et al. | 340/781 |
| 4,996,523 | 2/1991 | Bell et al. | 340/781 |
| 5,049,865 | 9/1991 | Nakamura et al. | 340/758 |
| 5,059,960 | 10/1991 | Rosenburg et al. | 340/111 |
| 5,066,895 | 11/1991 | Alessio | 315/226 |
| 5,087,858 | 2/1992 | Cherry et al. | 315/169.3 |
| 5,093,654 | 3/1992 | Swift et al. | 340/781 |
| 5,097,396 | 3/1992 | Myers | 362/32 |
| 5,138,119 | 8/1992 | Demeo | 200/5 A |
| 5,149,923 | 9/1992 | Demeo | 200/5 A |
| 5,315,311 | 5/1994 | Honkala | 345/76 |
| 5,336,978 | 8/1994 | Alessio | 315/169.3 |
| 5,337,073 | 8/1994 | Tsunoda et al. | 345/102 |
| 5,359,341 | 10/1994 | Hutchings | 345/45 |

OTHER PUBLICATIONS

E.R. Wiener, "Touchlight Control/Display Panel", IBM Technical Disclosure Bulletin, vol. 14, No. 7, Dec. 1971, pp. 1963–1965.

*Primary Examiner*—Robert Pascal
*Assistant Examiner*—Michael Shingleton
*Attorney, Agent, or Firm*—Donald A. Wilkinson; Roger L. May

[57] ABSTRACT

A control for multiple circuit illumination lamp panels includes a group of electroluminescent panel segments including a first set of electroluminescent panel segments unique to a function mode and at least one second set of electroluminescent segments associated with at least one common indicia for at least two functional modes in combining first and second sets related to a functional to form a mode group. The sum of the areas of each mode group is then equalized to provide consistent illumination intensity and coloring regardless of the functional mode selected for the radio. Sizing of the segments can be provided by enhancing conductive areas aligned with, adjacent to or remote from the conductive areas aligned with indicia on the bezel and on the actuators on the bezel. The balancing of illumination intensity can also be incorporated in multiple electroluminescent panels so that a single switching power supply can be utilized with several audio system bezel designs having different functional modes.

17 Claims, 3 Drawing Sheets

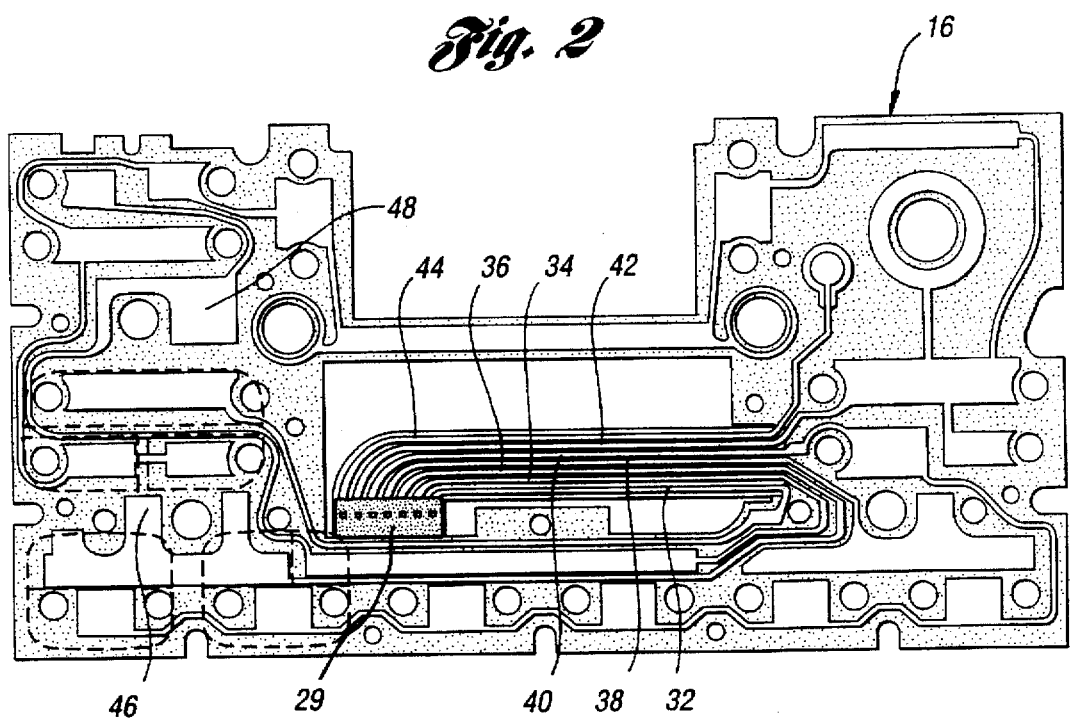
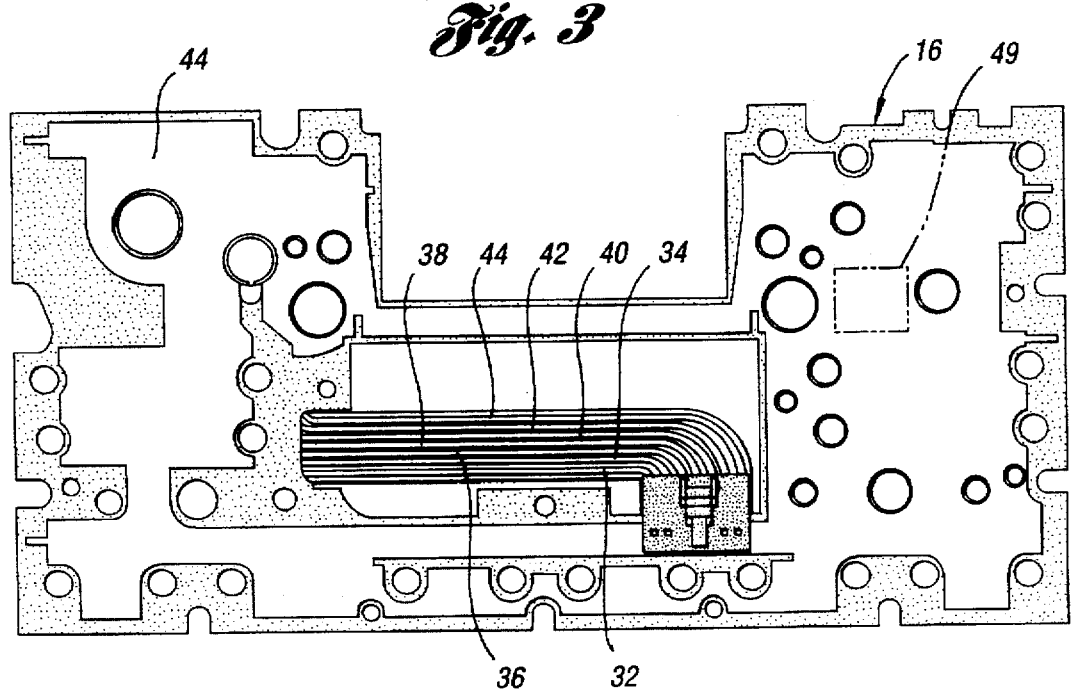

CONTROL FOR MULTIPLE CIRCUIT ELECTROLUMINESCENT LAMP PANEL

FIELD OF INVENTION

The present invention relates generally to illumination of indicia on a control panel and, more particularly, to controlled illumination by electroluminescent lamp (EL) panel paths of audio system bezels having optical indicia on the housing or on the controls for a variety of audio system functional modes.

BACKGROUND ART

Control panels often have background illumination in order to expose graphics or optical indicia that identify the functions related to particular controls on the control panel. The traditional choice for illuminating control panel graphics located above, on or below a button or switch actuator, particularly in motor vehicle audio entertainment systems, has been an arrangement of incandescent lamps and light pipes, for example, as shown in U.S. Pat. No. 4,449,024. A light pipe may be formed as a transparent or translucent panel but must be specially constructed with reflecting baffle surfaces and the like to direct light rays in particular directions at various distances and locations from an incandescent light source. Thus the substantial engineering, design and implementation of the light pipe requires a long lead time, particularly with a complex light path arrangement for audio system control bezels. Accordingly, such structures were correspondingly expensive.

Moreover, the previous light pipe systems do not offer a balance of light color and intensity throughout the light pipe and they provide little or no differentiation of function graphics carried on a button actuator. For example, the illumination is unable to differentiate or selectively illuminate the operable controls of an audio system bezel or control panel during operation of a radio receiver in a particular functional mode. An actuator for selectable functions operable during functional modes, such as the forward or reverse function actuator to be used during operation of a cassette tape player or a compact disc player, may have other functions once a different operating mode has been selected on the control panel. Furthermore, the light reflective surfaces arranged to reflect light toward a push button face after traveling transversely behind the buttons through the light pipe introduce illumination losses that reduce visibility identification of the indicia, distinction between the indicia, and a user's selection of desired control.

Other known lighting structures include background illumination for translucent or clear button grids where a light source provides background lighting for indicia in the button. For example, U.S. Pat. Nos. 5,138,119 and 5,149,923 to Demeo disclose tactile dome switches with an illumination diode positioned beneath each dome. In other instances, the illumination is provided by an electroluminescent panel providing back lighting for the indicia. For example, U.S. Pat. Nos. 4,060,703, 4,320,268 and 4,532,395 disclose keyboard panels in which an electroluminescent panel provides background illumination for the push button indicia. Nevertheless, the previous luminescent panel does not distinguish one set of push buttons from another, even where the push button may be provided with multiple functions in different operating modes of the apparatus.

Moreover, in view of the complicated structures and the numerous layers of transparent or translucent material through which the light must be transmitted and controlled, previous switch constructions have suffered from mechanical disadvantages such as poor tactile response or feel. Accordingly, many engineering tradeoffs required a compromise between illumination clarity and switch reliability or operability.

In addition, multiple electroluminescent lamps or lamp segments on a single electroluminescent lamp panel segregated by function would vary in size. The excitation of differently sized panels or different portions of the panel would impose substantial differences in the illumination intensity of the differently sized and differently shaped lamp segments. Moreover, the illumination intensity as well as the color are substantially affected by the inductance and capacitance of the electrical components in the driving and the load circuit, particularly since the lamp segments of the electroluminescent lamp panel act as a capacitor. Accordingly, lamp panel segments particularly configured to match sets of indicia for particular functional modes of the control panel could require substantially different driving circuits in order to maintain constant illumination intensity throughout the indicia of the control panel regardless of the particular functional mode selected for operation at the control panel.

SUMMARY OF THE PRESENT INVENTION

The present invention overcomes the abovementioned disadvantages by providing an electroluminescent lamp (EL) panel circuit in which at least one electroluminescent lamp panel includes a plurality of discrete segments and a switching power supply that enables the discrete segments to be illuminated in groups particularly configured to control distribution and illumination intensity. In the preferred embodiment the segments are contained in a single electroluminescent lamp panel controlled by a single power supply balanced with each of the loads to provide consistent illumination intensity regardless of the functional mode in which the control panel is employed. Alternatively, the discrete segments may be provided on multiple independent, separately configured electric lamp panels that are engageable with a driving compatible circuit of the same type to provide consistent illumination intensity throughout a multiple product line.

The present invention also provides a method for equalizing light intensity from a plurality of electroluminescent panel segments formed in at least one electroluminescent lamp panel for a multi-functional control panel having a plurality of functional modes and a plurality of indicia locations relating to each mode. The method defines a group of electroluminescent lamp panel segments to be illuminated for each functional mode, including selecting at least one first set of the EL segments, selecting at least one second set of EL panel segments and combining selected first and second sets related to a functional mode; in addition to sizing portions of each segment, determining the mode group having the largest area, and enhancing the area of other mode groups to match the largest area load group. The first set of segments includes indicia locations unique to each functional mode. The second set of electroluminescent panel segments includes segments associated with at least one common indicia location for at least two functional modes on the control panel.

In the preferred embodiment, an audio system control panel bezel having indicia locations on the bezel as well as on actuators positioned in the bezel includes selective lighting apparatus according to the present invention. Multiple function identifying indicia, either on the actuators or on the bezel, are aligned with electroluminescent lamp panel segments defined by conductive surfaces on the lamp panel. A plurality of segments includes at least one first set of electroluminescent lamp panels segments aligned with indicia locations unique to a functional mode, for example, autoset during radio play that is not used for compact disc or tape media operation. In addition, the plurality of circuits include at least one second set of electroluminescent lamp panel segments aligned with indicia locations associated with at least one common indicia for at least two functional modes, for example, an indicator active during both tape and compact disc functional modes, for example, fast forward and rewind indicators.

In any event, a coupler including an invertor and a plurality of switches or branches, the combined number of invertor paths of switches and branches corresponding in number to the number of segments, is subject to a controller that controls illumination of various portions of the panel and thus the radio bezel in response to a selected functional mode, for example radio operation. Nevertheless, the light intensity from the group of illuminated segments remain substantially constant regardless of whether radio, tape or compact disc operation is selected.

In the preferred embodiment a single invertor with a transformer drives the load, and the load is balanced with the coupler by matching the areas of the segments in the electroluminescent lamp panel. In addition, the total area in each group of segments selected for illumination in the EL panel can remain consistent with the group areas selected for illumination on an alternative lamp panel configuration so that alternative or substitute control panel devices can be operated with the same switching power supply.

Accordingly, the present invention provides a segmented electroluminescent lamp panel particularly arranged for controlled illumination of control panel indicia locations regardless of the functional mode selected for use. As a result, the present invention provides better illumination control for radio bezel than previously known radio bezel constructions such as those having light pipes. In addition, the present invention renders a single switching power supply compatible with alternative radio bezel embodiments for example the standard and optional radio selections of analog radio, digital radio or digital radio with compact disc functional mode as may be made available to a motor vehicle purchaser. In addition, the present invention provides a highly efficient illumination technique that permits only the operable portions of the indicia on the bezel to be illuminated at a desired level during operation of a particular functional mode.

BRIEF DESCRIPTION OF THE DRAWINGS

The present invention will be more clearly understood by reference to the following detailed description of a preferred embodiment when read in conjunction with the accompanying drawings in which like reference characters refer to like parts throughout the views and in which:

FIG. 2 is a reverse, plan view layout of the electroluminescent lamp panel shown in FIG. 1;

FIG. 3 is a front plan view of an electroluminescent lamp panel shown in FIGS. 1 and 2.

DETAILED DESCRIPTION OF A PREFERRED EMBODIMENT

Figure 1:
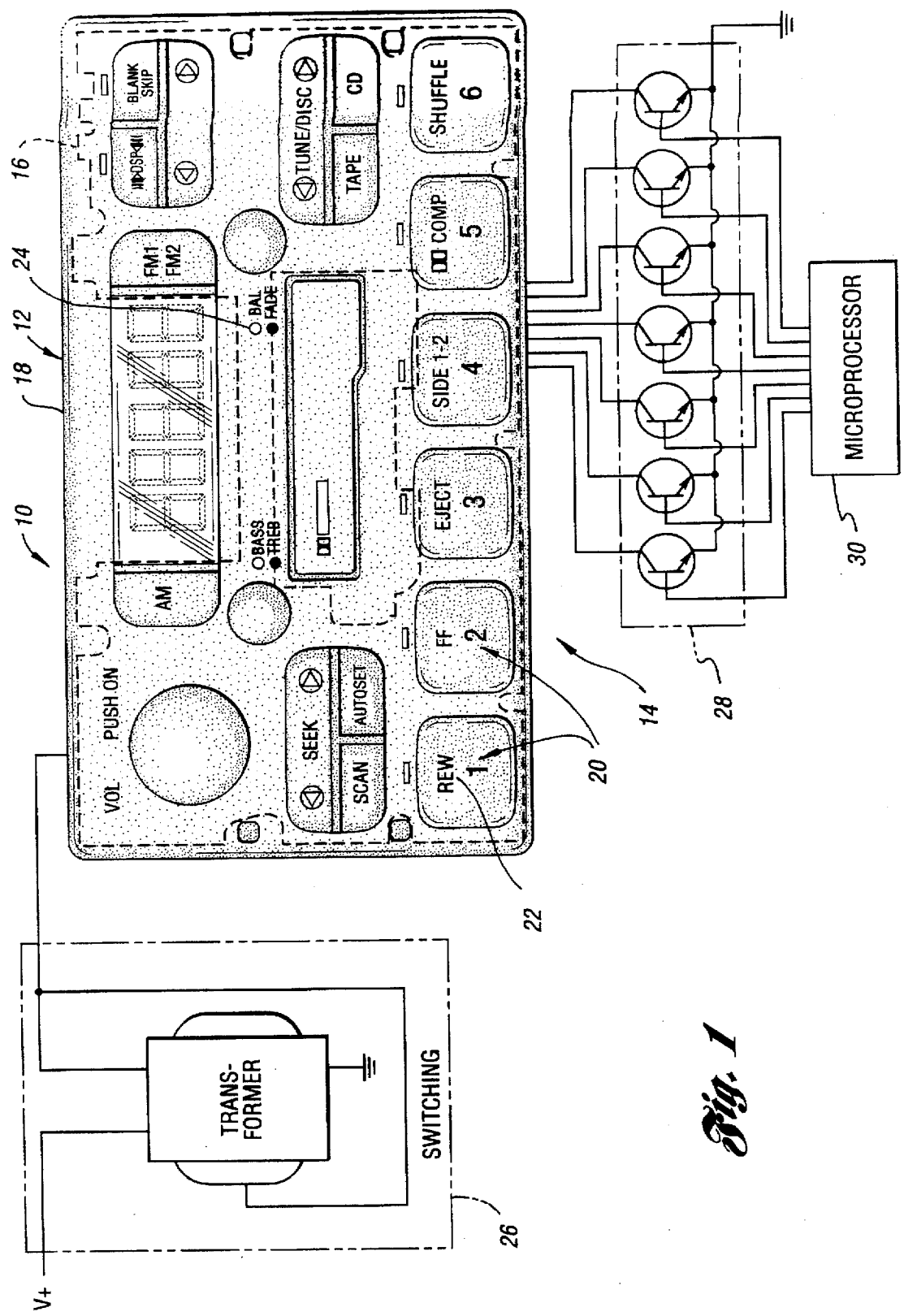
FIG. 1 is a diagrammatic, partly schematic view of an audio entertainment system control including the bezel and illumination circuitry.

Referring first to FIG. 1, an audio entertainment system 10 includes a control panel 12 and an illumination circuit 14.

The illumination circuit 14 includes the electroluminescent lamp panel underlaying a bezel 18. The bezel 18 includes a plurality of indicia locations 20, which may be directly carried on actuators as shown at 22 or in locations adjacent actuators as shown at 24. In any event, a plurality of indicia locations 20 both on actuators and on the bezel will be aligned over circuit segments of the electroluminescent lamp panel as will be described in greater detail below.

The illumination circuit 14 also includes an invertor 26 that converts the motor vehicle supply d.c. voltage, for example, from the headlamp voltage, to an alternating current that drives the lamp panel. In addition, a bank 28 including a plurality of switches and branches selectively apply the alternating current to a plurality of electroluminescent lamp panel segments at terminal connector 29 with a plurality of terminals (FIG. 2) as will be described in greater detail below in response to the signalling generated in a microprocessor 30. As a result, the present invention provides a switching power supply that groups EL panel segments for illumination intensity control as described in greater detail below.

In the preferred embodiment, the actuators are buttons carried in openings in the bezel and biased outwardly from the face of the bezel by an elastomeric switch path lying between the light panel 16 and bezel 18. The elastomeric switch path includes a wall around the opening that serves to channel light from electroluminescent lamp panel 16 to the optical indicia 20 on the button or the bezel. Contacts carried by the elastomeric wall remain spaced apart from the complimentary switch closure. When the buttons are pressed against the resilient biasing force of the elastomeric switch path, they displace the contact members through openings and into engagement with complimentary switch closures, for example, terminal conductors on a wiring board. The details of such an arrangement are shown for example, in allowed U.S. patent application Ser. No. 122,469, filed Sep. 17, 1993 now abandoned in lieu of continuation application Ser. No. 397,314, filed May 19, 1995, now U.S. Pat. No. 5,570,114 incorporated by reference herein.

The illuminating system for the bezel 18 of the present invention serves to improve identification of controls applicable to each functional mode of the audio system by separately illuminating the applicable controls related to each functional mode of the audio system.

The electroluminescent lamp panel 16 is preferably made of a microencapsulated phosphor layer intermediate conductive plates, for example, a Durel 3 trim light for a.c. current activation, having surface coated mylar as conductive surfaces. In such a panel, glass beads containing phosphor lie between two conductive layers. In the present invention, a plurality of circuit segments may be formed in the electroluminescent panel, for example, by an indium tin oxide layer forming conductive surfaces on opposite sides of the phosphor layer. The segments can be shaped, for example by oblation of portions of the layer, to form a plurality of chargeable areas such as 32, 34, 36, 38, 40 and 42 on one side of the microencapsulated phosphor as shown in FIG. 2. An additional conductive area is formed on another conductive surface on the opposite side of the microencapsulated phosphor as shown at 44 in FIG. 3. Each of the shaped conductive surfaces connects to a terminal on connector 29 on the electroluminescent lamp panel adapted to be coupled in the illumination circuit.

The EL panel 16 is divided into enough segments of conductive areas so that selective lighting of the indicia applicable to a functional mode can be achieved without unwanted LIT segments being made visible to the user. As a result, indicia locations that are unique to one mode of operation are joined in a single segment. For example, a plurality of indicia locations unique to the particular functional mode, for example, the indicia related to the EJECT, SIDE 1–2, and Dolby noise reduction actuator buttons applicable to the tape functional mode are joined in segment 34. Indicia locations such as COMPRESSION and SHUFFLE related strictly to operation of a compact disc player are joined in segment 36. Similarly, functions related uniquely to the radio, such as AUTO-SET actuator button indicia and the pre-selected station button indicia numerals 1–6 are aligned with a joined segment 40.

Additional segments are made by forming conductive paths combining indicia locations to be illuminated for at least two modes of operation. For example, indicia used at the TUNE/DISCS actuator enables a single control for use in the radio operation as well as the compact disc player, is illuminated by the conductive surface segment 32. Similarly, segment 38 illuminates indicia when a TAPE functional mode or the CD functional mode is actuated, for example, the actuators operable as rewind and fast forward controls. Segment 42 provides illumination for indicia locations used in all functional modes, for example, BASS, TREBLE, BALANCE and FADE controls, PUSH-ON VOLUME control, FM1 and FM2 selector buttons, as well as SEEK, SCAN, TAPE, CD and the forward and reverse arrows. Segment 44 which forms the opposite plate of the capacitive segments, may be termed a power feed segment, as will be discussed in detail below.

When the minimum number of segments have been identified in order to achieve selective lighting directed to each of the functional modes of the audio system, the segments are arranged in groups corresponding to the mode of operation. Accordingly, if the radio functional mode is selected, segments 32, 40 and 42 will be supplied to illuminate the appropriate indicia locations. Similarly, circuits must be completed with segments 34, 38 and 42 when the tape functional mode is selected. Similarly, the circuits must be completed with segments 32, 36, 38 and 42 when the compact disc (CD) functional mode has been selected.

Having determined the segments associated with the functional modes, the sum of the areas of the segments in a group pertaining to each functional mode is determined, and the largest total area for a functional mode determines a target area. The target area can be reduced to limit the power necessary to illuminate the control panel by limiting the area exposed at each indicia location. However, a predetermined level of illumination intensity may limit the amount of reduction that can be achieved to the area. Nevertheless, if possible it may be desirable to limit the area of the target area to the next smallest area covered by an alternative functional mode.

Once the target area has been determined, the area of the other groups of segments is adjusted to equalize the area offered by each mode group of combined segment sets. Such equalization equalizes the load to be applied to the driving circuit for the EL panel.

Preferably, the segments for unique connections for the modes, for example, segments 34, 36 and 40 are expanded initially. Preferably, the additions are made at locations as shown at 46 adjacent to or contiguous with segment areas that are aligned with the indicia locations. The use of areas contiguous to the areas aligned to the indicia location enables partitions in the actuators, elastemeric layers or other structures to obscure the additional illumination that may be provided by such areas. Alternatively, the additional areas may be located at areas remote from the indicia locations as shown at 48, so that the additional illuminated areas are covered by opaque portions of the bezel. Moreover, the additional conductive surface areas may be phantom areas, that are not aligned with portions of the circuit segment 44 formed as a power feed segment as shown in phantom line at 49, whereby the additional surface area creates a phantom segment that does not illuminate the conductive area 48 when power is applied to the segment. Nevertheless, the phantom segment creates a necessary load in segment 34 to equalize the illumination intensity provided by each group of segments supplied with a drive signal during operation of the selected functional modes.

Figure 4:
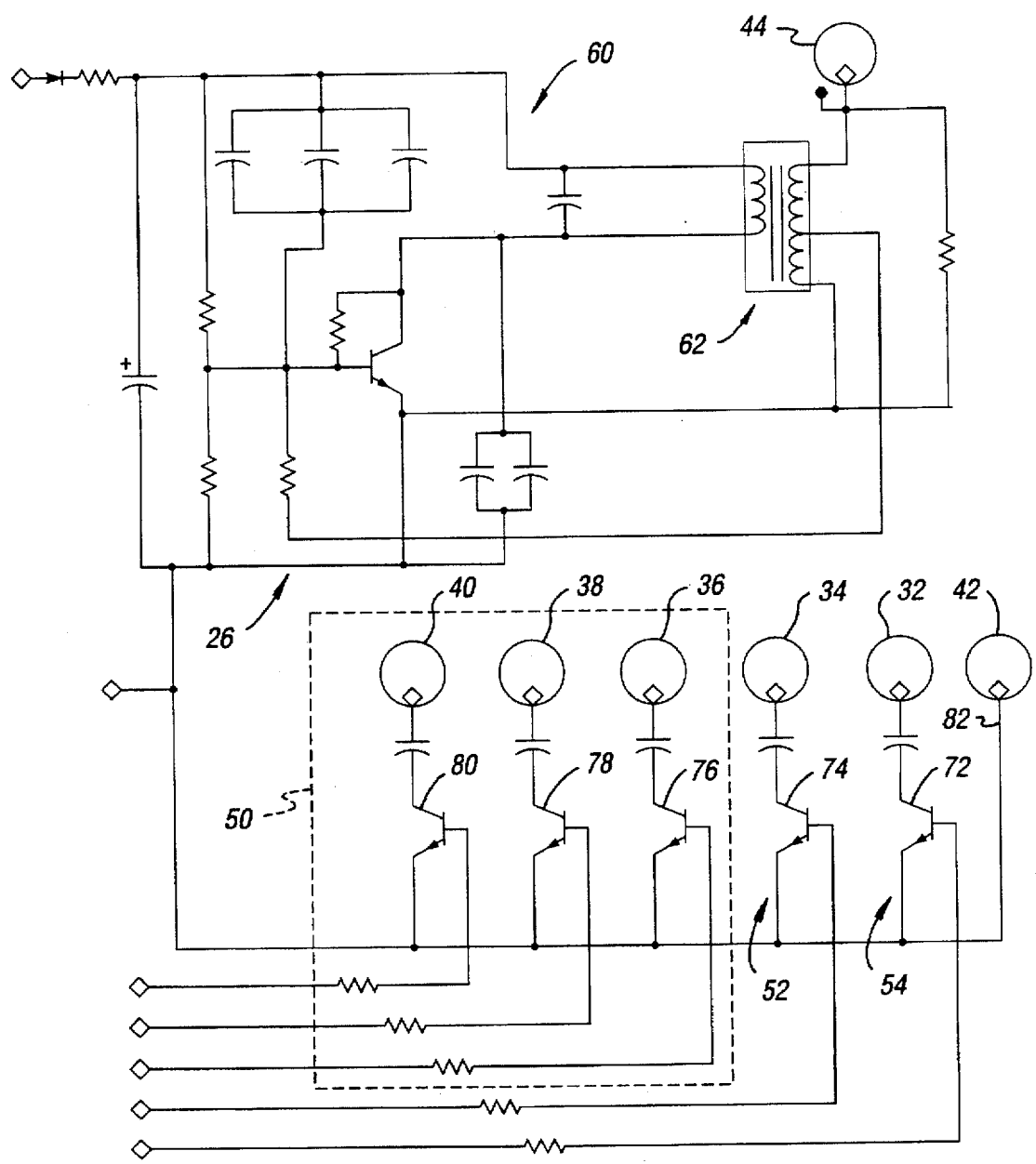
FIG. 4 is a schematic diagram of illumination circuitry shown in FIG. 1.

As shown in FIG. 4, the inverter 26 that supplies power to the segments includes a switching circuit 60 and a transformer 62. The load balance as previously discussed is particularly important to proper illumination intensity as the reactance of the inductive coils in the transformer offsets the reactance of the capacitive load provided by the EL panel segment groups. Thus, to ensure both a proper illumination intensity, and a proper color of generated light which is dependant upon the frequency of the signal flowing through the completed circuit containing the segments, it is generally necessary to design a particular transformer for use in controlling the groups of selected target areas according to conventional design criteria. Accordingly, a coarse adjustment in the transformer may be provided by adjusting the gap in the core typically governed by layers of separation paper in the core. In addition, a medium degree of adjustment may be provided by changing the gauge of the conductor coil to form the transformer. Generally, the gauge is limited by the packaging space available on a particular bobbin. In addition, the transformer may be fine-tuned by controlling the number of turns in each coil provided in the transformer.

Preferably the switching control comprises a plurality of transistors 72–80 and that ground the capacitive segments 32–42 to complete the circuit from the power feed segment. Accordingly, upon receipt of a signal from the microprocessor, each segment 32–40 becomes electrically grounded and powered to generate the illumination intensity desired. In addition, the equalization of the areas of the groups of segments equalizes the capacitance of the load coupled to the driving circuit, and enables consistent illumination intensity and color to be provided to the audio system bezel 16 regardless of the functional mode selected.

Compatibility is also achievable with audio bezels having different segment portions. For example, as shown at 50, a group of segments may be related solely to actuator functions related to a particular functional mode. As an example, a compact disc player may be offered as an option only and some radios may be provided without segments for illuminating indicia related only to compact disc operation. As a result, the circuit portion and corresponding lamp segments 40, 38 and 36 as shown at 50 would be provided only with certain units. Accordingly, the lamp panels having segments corresponding to only branch circuits 52 and 54 shown in FIG. 4 would be made with enhanced conductive surfaces to reach a target area. Accordingly, the impedance offered to the transformer 62 in the invertor 26 would be compatible so that the same transformer 62 could be used even if the radio supplied does not include a compact disc player. Nevertheless, the illumination intensity and coloring would be consistent with the bezel applied to the radio having the compact disc player appearing the same as a bezel applied to the radio not having the compact disc player.

Having thus described the present invention, many modifications will become apparent to those skilled in the art to which it pertains without departing from the scope and spirit of the present invention as defined in the appended claims.

What is claimed is:

1. A method for equalizing light intensity from a plurality of electroluminescent panel segments formed on an electroluminescent lamp panel, each segment having shaped and sized conductive surfaces aligned with indicia related to a multifunctional control panel having a plurality of functional modes and a plurality of indicia locations related to each mode, the method comprising, defining a group of electroluminescent panel segments to be illuminated for each functional mode including, selecting at least one first set of electroluminescent panel segments from each said group that is associated with an indicia location unique to one of said functional modes, selecting at least one second set of electroluminescent segments from each said group that is associated with at least one common indicia location for at least two functional modes of said control panel, and combining the first and second sets related to a functional mode to form a mode group for each functional mode;

sizing portions of each set for illumination of said indicia or actuator locations;

determining the mode group having a target area;

adjusting the load of each mode group to match the load of said target group; and switching a supply voltage to each said mode group upon selection of a respective functional mode.

2. The invention as defined in claim 1 wherein said adjusting step comprises enlarging conductive surfaces aligned with said indicia locations.

3. The invention as defined in claim 1 wherein said adjusting step comprises enlarging conductive surfaces adjacent to areas aligned with said indicia locations.

4. The invention as defined in claim 1 wherein said adjusting step comprises enlarging conductive surfaces remote from said indicia locations.

5. The invention as defined in claim 1 and further comprising the step of reducing the largest mode group area before said adjusting step.

6. The invention as defined in claim 1 wherein said switching step comprises coupling each said group to a single invertor.

7. The invention as defined in claim 6 wherein said invertor has a common transformer.

8. A selective lighting apparatus for illuminating a multiple functional mode control panel including dispersed indicia locations for each of a plurality of functional modes, and an electroluminescent lamp panel having a plurality of segments, each segment defined by conductive surfaces aligned with at least one indicia, said apparatus comprising, said plurality of segments including at least one first set of electroluminescent lamp panel segments combined as associated with indicia locations unique to a functional mode, and said plurality of segments including at least one second set of electroluminescent panel segments as a mode group combined as associated with at least one common indicia for at least two functional modes, a coupler including as invertor, and invertor paths corresponding in number to the number of segments on said lamp panel, and a switch control for activating said switches in groups combining illuminated actuation of selected first and second sets of segments related to a functional mode.

9. The invention as defined in claim 8 wherein the conductive surface area of electroluminescent lamp panel segments activated by each group of switches is the same as the surface area of each other group to maintain consistent illumination intensity in each functional mode.

10. The invention as defined in claim 8 wherein a first of said groups is coupled to a combination of conductive areas positioned in direct alignment with indicia locations on said bezel, and forming the largest area and other said groups include additional conductive surfaces to match the area of said first combination of conductive areas driven by said first group.

11. The invention as defined in claim 10 wherein said additional conductive surfaces comprise supplemental conductive surfaces adjacent to conductive surfaces in alignment with said indicia.

12. The invention as defined in claim 11 wherein said supplemental surfaces are covered by opaque bezel portions.

13. The invention as defined in claim 10 wherein said additional conductive surfaces comprise remote conductive surfaces apart from conductive surfaces in alignment with said indicia.

14. The invention as defined in claim 13 wherein said supplemental surfaces are covered by opaque bezel portions.

15. The invention as defined in claim 10 wherein said additional conductive surfaces form phantom illumination electroluminescent lamp panel circuit portions.

16. A selective lighting apparatus for illuminating a multiple functional mode control panel including multiple indicia locations for each of a plurality of functional modes, said apparatus comprising, at least two electroluminescent lamp panels, each panel having a plurality of segments at least one group of segments associated with at least one functional circuit being independent of every group on the other electroluminescent lamp panel, each segment defined by conductive surfaces aligned with at least one indicia, said plurality of segments including at least one first set of electroluminescent lamp panel segments combined as associated with indicia locations unique to a functional mode, and said plurality of segments including at least one second set of electroluminescent panel segments combined as associated with at least one common indicia for at least two functional modes, a coupler including an invertor, and invertor paths corresponding in number to the number of segments, on said lamp panel, and a switch control for activating said switches in groups combining illumination of selected first and second sets of segments related to a functional mode, wherein the conductive surface area of electroluminescent lamp panel segments activated by each group of switches is the same as the surface area of each other group to maintain consistent illumination intensity in each functional mode, whereby the coupler forms a common switching power supply for each electroluminescent lamp panel that provides consistent illumination intensity from each panel interchangeably.

17. The invention as defined in claim 1 wherein said switching comprises switching a supply voltage to each segment in the selected sets of said mode group.

* * * * *